United States Patent
Cohen et al.

(10) Patent No.: US 8,929,455 B2
(45) Date of Patent: Jan. 6, 2015

(54) METHOD FOR SELECTING TRANSFORM TYPES FROM MAPPING TABLE FOR PREDICTION MODES

(75) Inventors: Robert A. Cohen, Somerville, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 803 days.

(21) Appl. No.: 13/175,737

(22) Filed: Jul. 1, 2011

(65) Prior Publication Data

US 2013/0003828 A1 Jan. 3, 2013

(51) Int. Cl.
| | |
|---|---|
| H04N 7/12 | (2006.01) |
| H04N 19/102 | (2014.01) |
| H04N 19/10 | (2014.01) |
| H04N 19/12 | (2014.01) |
| H04N 19/159 | (2014.01) |
| H04N 19/61 | (2014.01) |
| H04N 19/11 | (2014.01) |

(52) U.S. Cl.
CPC ....... *H04N 7/26101* (2013.01); *H04N 7/26005* (2013.01); *H04N 19/00078* (2013.01); *H04N 19/00218* (2013.01); *H04N 19/00781* (2013.01); *H04N 19/00042* (2013.01)
USPC .............. 375/240.18; 375/240.02; 375/240.2; 375/240

(58) Field of Classification Search
CPC ............. H04N 1/321–1/3215; H04N 7/26101; H04N 7/30; H04N 7/50; H04N 7/26005
See application file for complete search history.

(56) References Cited

U.S. PATENT DOCUMENTS

| | | | | |
|---|---|---|---|---|
| 7,925,107 | B2* | 4/2011 | Kim et al. | 382/248 |
| 8,208,532 | B2* | 6/2012 | Ekman | 375/240 |
| 8,249,147 | B2* | 8/2012 | Watanabe et al. | 375/240.03 |
| 8,594,183 | B2* | 11/2013 | Han et al. | 375/240.01 |
| 8,798,159 | B2* | 8/2014 | Han et al. | 375/240.24 |
| 2006/0104357 | A1* | 5/2006 | Burazerovic et al. | 375/240.15 |
| 2009/0238271 | A1* | 9/2009 | Kim et al. | 375/240.12 |
| 2011/0293002 | A1* | 12/2011 | Sole et al. | 375/240.12 |
| 2012/0121009 | A1* | 5/2012 | Lu et al. | 375/240.02 |

(Continued)

OTHER PUBLICATIONS

Cohen et al. "Direction-Adaptive transforms for Coding Prediction Residuals". (Nov. 2010) IEEE Inter. Con. on Image Processing 2010.*
Saxena et al. "Jointly optimal intra prediction and adaptive primary transform". (Oct. 2010) JCT-VC C108 ISO/IEC JTC1/SC29/WG11.*

*Primary Examiner* — Sath V Perungavoor
*Assistant Examiner* — Matthew J Anderson
(74) *Attorney, Agent, or Firm* — Dirk Brinkman; Gene Vinokur

(57) ABSTRACT

A method codes pictures in a bitstream, wherein the bitstream includes coded pictures to obtain data for associated TUs and data for generating a transform tree, and a partitioning of coding units (CUs) into Prediction Units (PUs), and data for obtaining prediction modes or directions associated with each PU. One or more mapping tables are defined, wherein each row of each table has an associated index and a first set of transform types to be used for applying an inverse transformation to the data in TU. The first set of transform types is selected according to an index, and then a second set of transform types is applied as the inverse transformation to the data, wherein the second set of transform types is determined according to the first set of transform types and a transform-toggle flag (ttf) to obtain a reconstructed prediction residual.

26 Claims, 3 Drawing Sheets

| 250 | 201 | 202 | 203 260 | 204 | 251 |
|---|---|---|---|---|---|
| Index | Mode | Vertical Transform | Horizontal Transform | | Other Transforms |
| 0 | VER | DST | DCT | | |
| 1 | HOR | DCT swap | DST | | |
| 2 | DC | DCT | DCT | | |
| ... | ... | ... | ... | | DWT 270 |
| 32 | HOR+5 | DCT | DST | | UDWT |
| 33 | HOR+7 | DCT | DST | | |

(56) References Cited

U.S. PATENT DOCUMENTS

| | | | |
|---|---|---|---|
| 2012/0147947 A1* | 6/2012 | Chien et al. | 375/240.02 |
| 2012/0163469 A1* | 6/2012 | Kim et al. | 375/240.18 |
| 2012/0170662 A1* | 7/2012 | Karczewicz et al. | 375/240.18 |
| 2012/0177118 A1* | 7/2012 | Karczewicz et al. | 375/240.13 |
| 2012/0230411 A1* | 9/2012 | Liu et al. | 375/240.16 |
| 2012/0287989 A1* | 11/2012 | Budagavi et al. | 375/240.03 |
| 2013/0308701 A1* | 11/2013 | Chen et al. | 375/240.12 |

\* cited by examiner

| Index ~201 | Mode ~202 | Vertical Transform ~203 | Horizontal Transform ~204 |
|---|---|---|---|
| 0 | VER | DST | DCT |
| 1 | HOR | DCT | DST |
| 2 | DC | DCT | DCT |
| ... | ... | ... | ... |
| 32 | HOR+5 | DCT | DST |
| 33 | HOR+7 | DCT | DST |

Fig. 2A
Prior Art

METHOD FOR SELECTING TRANSFORM TYPES FROM MAPPING TABLE FOR PREDICTION MODES

RELATED APPLICATION

This U.S. Patent Application is related to U.S. patent application Ser. No. 13/169,959 "Method for Coding Pictures Using Hierarchical Transform Units," filed by Cohen et al. on Jun. 27, 2011, incorporated herein by reference.

FIELD OF THE INVENTION

The invention relates generally to coding pictures, and more particularly to methods for coding pictures using selected transforms in the context of encoding and decoding pictures.

BACKGROUND OF THE INVENTION

For the High Efficiency Video Coding (HEVC) standard currently under consideration by the ISO and ITU standards organizations, Discrete Cosine Transforms (DCT) and/or Discrete Sine Transforms (DST) are applied to 4×4 blocks of data. The decision as to which transform types to apply horizontally and vertically is defined by a look-up table, see FIG. 2A, which that maps an indexed Intra prediction direction to a horizontal transform type and a vertical transform type. This mapping is described in "CE7: Mode-dependent DCT or DST without 4×4 full matrix multiplication for intra prediction," JCTVC-E125, Joint Collaborative Team on Video Coding (JCT-VC) of ITU-T SG16 WP3, ISO/IEC JTC1/SC29/WG11, 5th Meeting: Geneva, CH, 16-23 Mar. 2011.

Coding Layers

The hierarchical coding layers defined in the proposed standard include video sequence, picture, slice, and treeblock layers. Higher layers contain lower layers.

Treeblock

According to the proposed standard, a picture is partitioned into slices, and each slice is partitioned into a sequence of treeblocks (TBs) ordered consecutively in a raster scan. Pictures and TBs are broadly analogous to frames and macroblocks, respectively, in previous video coding standards, such as H.264/AVC. The maximum allowed size of the TB is 64×64 pixels luma (intensity), and chroma (color) samples.

Coding Unit

A Coding Unit (CU) is the basic unit of splitting used for Intra and Inter prediction. Intra prediction operates in the spatial domain of a single picture, while Inter prediction operates in the temporal domain among the picture to be predicted and a set of previously-decoded pictures. The CU is always square, and can be 128×128 (LCU), 64×64, 32×32, 16×16 and 8×8 pixels. The CU allows recursive splitting into four equally sized blocks, starting from the TB. This process gives a content-adaptive coding tree structure comprised of CU blocks that can be as large as the TB, or as small as 8×8 pixels.

Prediction Unit (PU)

A Prediction Unit (PU) is the basic unit used for carrying the information (data) related to the prediction processes. In general, data contained within a PU is predicted using data from previously-decoded PUs. Each CU can contain one or more PUs.

Transform Unit (TU)

The TU is the basic unit used for the transformation and quantization processes. For Intra-coded blocks, the TU cannot be larger than the PU. Also, the TU does not exceed the size of the CU. Multiple TUs can be arranged in a tree structure, henceforth—transform tree. Each CU may contain one or more TUs, where multiple TUs can be arranged in a tree structure. Each TU has an associated Coded Block Flag (CBF), which indicates whether any of the transformed and quantized coefficients inside the TU are nonzero. If the CBF for a TU is zero (0), then all coefficients in the TU are zero, hence no inverse transformation needs to be performed. The inverse transformation is performed when the CBF is one (1).

Application of Transforms

After decoding and inverse-quantizing a block of data, or more specifically, an Intra prediction residual, from a bitstream, the decoder applies two-dimensional transforms to the data in the TUs corresponding to that block. For separable transforms, the inverse-transform process is implemented as a set of one-dimensional transforms or inverse transforms applied vertically, and a set of one-dimensional transforms or inverse transforms applied horizontally.

Intra Prediction

Intra prediction is the process of using previously-decoded blocks to act as predictors of the current block. The difference between the current block and the predicted block is known as the prediction residual. One or more pixels in the current block are predicted by previously-decoded neighboring pixels based upon an Intra prediction mode, which indicates the direction or angle of prediction. For example, Intra prediction mode 0 is the vertical prediction mode, where pixels in the current block are predicted from pixels located directly above, in the previously-decoded block. Intra prediction mode 1 is the horizontal prediction mode, where pixels in the current block are predicted from pixels located directly to the left, in the previously-decoded neighboring block. In the current draft of the standard, one Intra prediction direction is associated with each PU.

Mapping of Intra Prediction Mode to Transform Type

The prior art defines the table 200 that maps each Intra prediction mode to a particular horizontal and vertical transform type, which is used for both encoding and decoding the prediction residual, see "CE7: Mode-dependent DCT or DST without 4×4 full matrix multiplication for intra prediction," JCTVC-E125, Joint Collaborative Team on Video Coding (JCT-VC) of ITU-T SG16 WP3, ISO/IEC JTC1/SC29/WG11, 5th Meeting: Geneva, CH, 16-23 Mar. 2011, Table 1. For example, when decoding a block that uses Intra prediction mode 0, a DST is applied vertically, and a DCT is applied horizontally. When decoding a block that uses Intra prediction mode 1, a DCT is applied vertically, and a DST is applied horizontally.

The fixed mapping table is defined in the HEVC Working Draft. Currently, the mapping table only applies to 4×4 transforms. FIG. 2A shows a portion of the prior art mapping table

200. The columns in the table include indices 201, Intra prediction modes 202, vertical transforms 203, and horizontal transforms 204. The indices to the rows are 0-33, the mode relates to the directions, e.g., VER, HOR, and DC, etc., the vertical and horizontal transforms can be DCT or DST. The design of the mapping table was based upon certain assumptions regarding pixel correlations within images.

In practice, however, image or video blocks, and their residuals, do not necessarily match the model that was assumed to design the prior art mapping table 200 in the draft standard.

Hence, there is a need for altering the mapping during the decoding and encoding process. There is also a need for a method to indicate when the mapping among the modes and transform types should be altered for Intra and Inter prediction.

SUMMARY OF THE INVENTION

A bitstream includes coded CUs, and their corresponding PUs and TUs. For Intra-coded PUs, the bitstream includes a prediction mode, also known as prediction direction or prediction angle, associated with each PU. A mapping table defined in the decoder and encoder maps each prediction direction to a vertical transform type and to a horizontal transform type. If a PU contains a TU of a size for which a mapping table is defined, and if a Coded Block Flag (CBF) for any of the TUs of that size are nonzero, then a "transform-toggle" (ttf) flag is present in the bitstream for the PU. The ttf indicates that the way that transforms are mapping is altered for all TUs of that size within the PU. The specific type of alteration to be performed when the ttf is set to one (1) is either pre-defined in the decoder and encoder, or it can be signaled in the bitstream. The ttf can also be a transform-toggle value, which can represent more than two conditions.

BRIEF DESCRIPTION OF THE DRAWINGS

FIG. 2A is a prior art table for mapping Intra prediction modes to DCT or DST along vertical and horizontal directions.

DETAILED DESCRIPTION OF THE INVENTION

Figure 1:
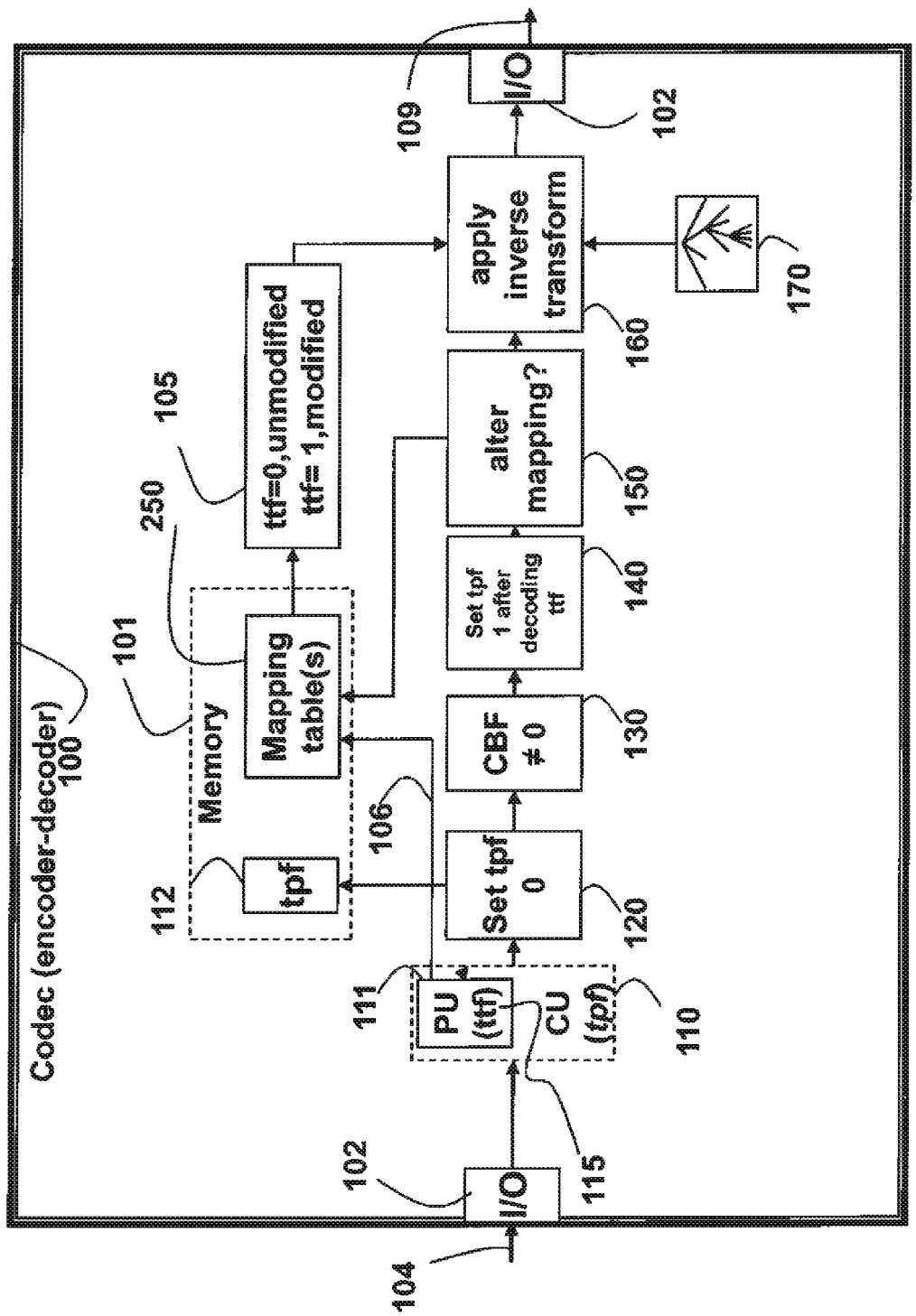
FIG. 1 is flow diagram of a method for selecting and altering transform types from mapping tables for prediction modes.

As shown in FIG. 1, the embodiments of our invention provide a method for altering a transform selection process used for decoding or encoding, generally "codec" 100, image/video data. The method steps can be performed in a video codec chip, which can include one or more processors connected to memory 101 and input/output (I/O) interfaces 102 as known in the art. The memory stores one or more mapping tables 250 as described herein, and the I/O interfaces receive an input bitstream 104, and outputs a reconstructed prediction residual 109.

Figure 2B:
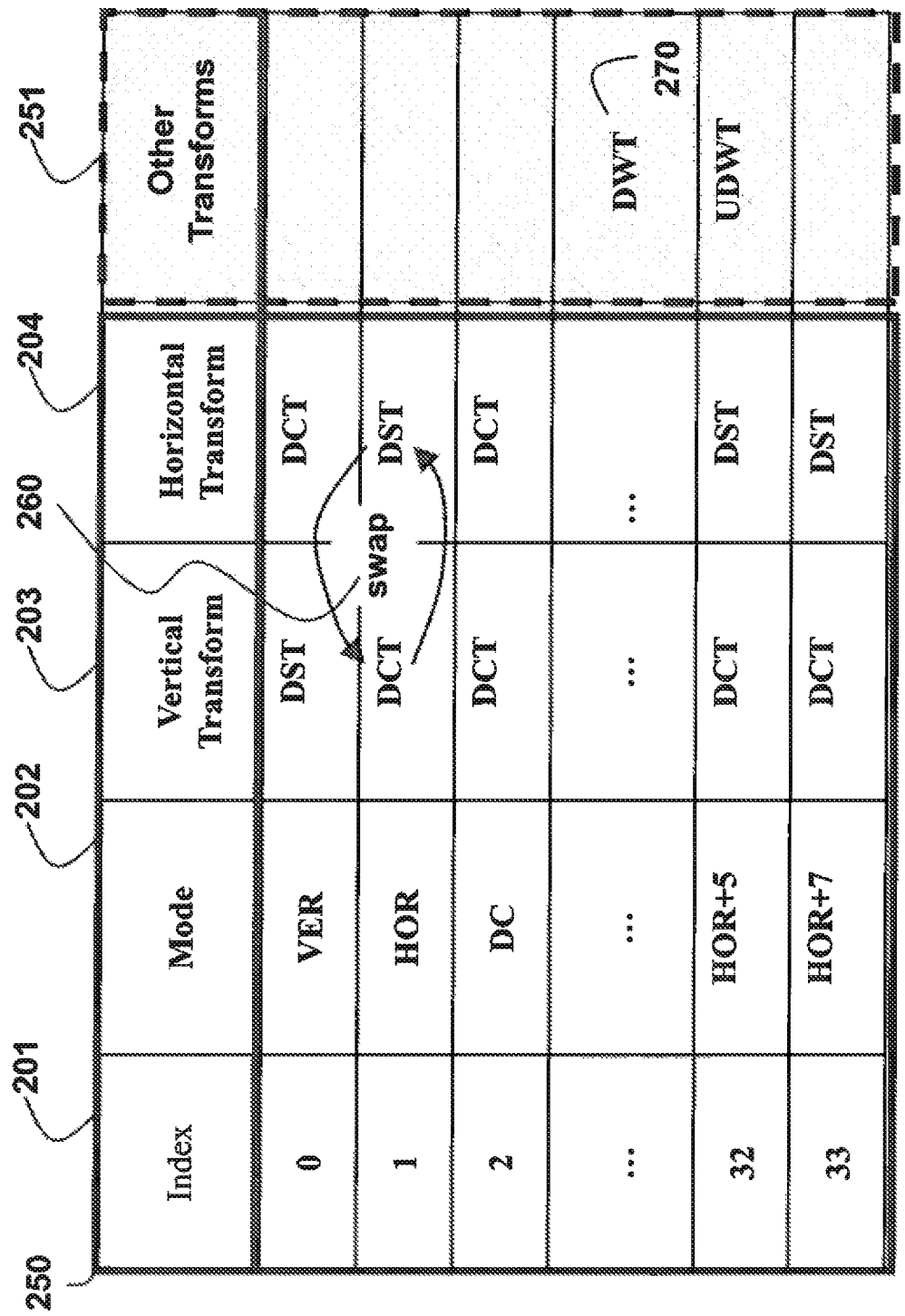
FIG. 2B is a table for altering the way mapping modes are mapped to inverse transforms.

In one embodiment as shown in FIG. 2B, one or more mapping tables 250 map each Intra prediction direction 106 to horizontal and vertical transform types (DCT or DST). In the proposed HEVC standard, the mapping table 200 is defined for TUs of size M×M. That is, each row has an index 201 for each transform mode, and a set of transform types.

The embodiments of the invention can provide additional mapping tables, or the identical table, to use for TUs of other possible sizes. The mapping table for each intra prediction modes includes modes or directions (VER or HOR or DC), a vertical inverse transform (DCT or DST), and a horizontal inverse transform (DCT or DST). The number of modes is specified in the working draft.

For each CU 110, one or more PU 111 are parsed from the input bitstream, and a transform tree 170 is generated. A "toggle-processed flag" (tpf) 112 associated with each PU is set to zero (0) 120. The tpf can be internal to the codec, e.g., stored in the memory or a register, and is not necessarily in the input bitstream 104.

The data in the TU is decoded according to the transform tree 170. The transform tree is described in detail in the related U.S. Patent Application, as well as the draft standard.

During the decoding, the first time an M×M TU with a nonzero CBF is encountered 130, a "transform-toggle flag" (ttf) 115 is decoded. The tpf for the PU that contains this TU is set 140 to one (1). If the TU is not M×M, and therefore does not have an associated mapping table, then the ttf is not decoded. In that case, the ttf remains unset. The decision on whether to set the ttf to 0 or 1 can also be based upon data already available or decoded, such as statistics from adjacent blocks, or other parameters. In this case, the ttf is not decoded from the bitstream, but is inferred from already available data.

If the ttf for a TU is set to 1, the ttf indicates that the way the transform types in the mapping table are applied to the TU is altered 150 for that TU.

Then, processing of the TU tree continues. The next time the M×M TU with a nonzero CBF is decoded, the tpf for its corresponding PU is checked. If the flag is set to one (1), then that indicates that the ttf for the PU has already been decoded, so the identical ttf is associated with this TU as well. In other words, the ttf is only present in the bitstream for the first M×M TU (with a non-zero CBF) contained in a PU, and the rest of the M×M TUs in that PU use the identical ttf.

During the decoding of the data in the TUs, the inverse vertical and horizontal transforms are applied 160 to the data in the TUs to obtain the output 109. The output 109 can be reconstructed prediction residual data, or other image/video-related data based upon the unaltered or altered mapping 105 that maps each Intra prediction direction to the vertical and horizontal transform types. If the ttf for the TU is set to zero (0), then the unaltered mapping is used. If the ttf for the TU is set to one (1), then the altered mapping is used.

Embodiment 1

In this embodiment, the steps above are applied, and if the ttf for a TU is one (1), then a DCT in the mapping table becomes a DST, and a DST becomes a DCT. In other words, if the original mapping table specifies that a DCT is used as the horizontal transform for a given prediction mode, then a DST is used if the ttf is one (1). Similarly, a DCT is used instead of a DST. If the transform-toggle is zero (0) set, then the original mapping is used.

Embodiment 2

This embodiment is similar to Embodiment 1, except mapping is altered only for Intra prediction directions for which both the horizontal and vertical transforms are different. Thus, if the table specifies that the DCT is used for both transforms, then the mapping is not altered. If the table specifies that a first set of horizontal DCT and vertical DST is used, then the mapping is altered so that a second set of horizontal DST and vertical DCT is used. The end effect is that the transforms in first set are swapped 260 to effectively result in the second set, as shown in FIG. 2B.

Embodiment 3

This embodiment is similar to Embodiment 1, except that the mapping of the first set is altered to the second set only for Intra prediction directions for which both the horizontal and vertical transforms are identical. This maps a 2-D ACT to a 2-D DST, and a 2-D DST to a 2-D DCT, without altering any 2-D transform where the horizontal and vertical transform types are different.

Embodiment 4

This embodiment includes any of the embodiments described above. In addition, the mapping is altered only for a subset of Intra prediction directions (modes). For example, the mapping for Intra prediction angles that are near-vertical and near-horizontal remain unaltered, but more oblique prediction angles are allowed to have the mapping from the first set to the second set altered. Thus, the decision as to alter the way the transforms are applied depends on both the transform type and prediction direction.

Embodiment 5

This embodiment is similar as Embodiment 4, and in addition, the transform in type is not used to determine whether to alter the way the transforms are applied. Hence, the way the transforms are applied is altered and is based on the prediction direction.

Embodiment 6

In the earlier embodiments, the mapping is altered depending on various factors. In this embodiment, a separate, predefined mapping table is used when the ttf is one (1). The ttf thus selects which of these two independent mapping tables to use.

Embodiment 7

In this embodiment, the ttf can have integer values other than 0 and 1 (false or true). In the case the value n represents an index, and the index is used to either alter the way transforms are applied, or to select an otherwise defined transform 270 according to the index, e.g., a discrete wavelet transform (DWT), undecimated discrete wavelet transform (UDWT), or some transform. That is, the table can be said to have an additional "virtual" column 251 of transforms, other than the transforms defined by the draft standard.

Embodiment 8

In this embodiment, the tpf is associated with a CU rather than a PU. Thus, only one ttf is decoded or inferred for each CU, and all TUs that use a ttf use that tpf flag.

Embodiment 9

In this embodiment, ttfs and tpfs are associated with more than one M×M TU size. For example, 4×4 TUs can use one table and, and 8×8 can use another. Different TU sizes can share tables and alternate mappings as well. For example, TUs of size 8×8 and smaller can use one table, and TUs of size 16×16 and larger can use another table.

Embodiment 10

This embodiment allows for altered mapping for PUs other than Intra predicted PUs. For example, data associated with Inter-predicted PUs can be used to index a mapping table to select horizontal and vertical transform types.

Embodiment 11

In this embodiment, the ttf is decoded or inferred for every TU, or for every M×M TU with a nonzero CBF. In this case, the tpf is not needed because every relevant TU is associated with its own ttf.

Embodiment 12

In this embodiment, an index indicating which mapping table to use is decoded once per sequence, or other subset of the bitstream, e.g. GOP, slice, etc.

Embodiment 13

In this embodiment, the mapping table or tables are defined and decoded from the bitstream.

Embodiment 14

In this embodiment, the depth of the TU within the transform tree is also used to determine if the mapping is altered before the transforms are applied.

Embodiment 15

One embodiment of the invention, deals with CUs or PUs that include multiple TUs having predetermined characteristics are signaled in the bitstream for specialized processing. When the CU or the PU includes multiple TUs with the predetermined characteristics, an indicator of how to process these TUs is only signaled in the bitstream for the first TU having the predetermined characteristics. Then, subsequent TUs, within the same PU or CU, having the same predetermined characteristics use that indicator, and the indicator is not signaled in the bitstream for the subsequent TUs for the CU or the PU. The predetermined characteristics can relate to the TU size or shape, intra or inter prediction, tree depth, and the like.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for coding pictures to obtain data for associated TUs and data for generating a transform tree, and data for obtaining prediction modes or directions associated with each Prediction Units (PUs), comprising:

defining a mapping table for each possible size of a TU, wherein each row of the table has an associated index and a first set of transform types to be used for applying an inverse transformation to the data in the TU;

selecting the first set of transform types according to an index;

applying a second set of transform types as the inverse transformation to the data, wherein the second set of transform types is determined according to the first set of transform types and a transform-toggle flag (ttf) to obtain a reconstructed prediction residual, and wherein the coding is performed in a codec.

2. The method of claim 1, wherein the coding decodes the bitstream.

3. The method of claim 1, wherein there is one ttf for each PU.

4. The method of claim 1, further comprising:
decoding the ttf from the bitstream and setting a toggle-processed flag (tpf) to 1.

5. The method of claim 1, further comprising:
setting the ttf according to decoded data.

6. The method of claim 1, wherein the mapping is unaltered if the ttf is set to 0, and the mapping is altered if the ttf is set to 1.

7. The method of claim 1, wherein the selected transform types are different for a horizontal transform and a vertical transform.

8. The method of claim 1, wherein the selected transform types are identical for a horizontal transform and a vertical transform.

9. The method of claim 1, wherein the index is altered only for a subset of Intra prediction directions.

10. The method of claim 1, wherein the index is altered based on an Intra prediction direction.

11. The method of claim 1, wherein there are multiple mapping tables and one of the multiple mapping tables is selected based on the ttf.

12. The method of claim 1, wherein the tpf is associated with the CU.

13. The method of claim 1, wherein the mapping table is used for inter prediction.

14. The method of claim 1, wherein the ttf is associated with each TU.

15. The method of claim 1, wherein the mapping table is defined in the bitstream.

16. The method of claim 1, wherein the ttf has more two values.

17. The method of claim 1, wherein a decision as whether to alter the index is dependent upon a depth of the TU in the transform tree.

18. The method of claim 1, wherein a decision to alter the index is dependent upon dimensions of the TU.

19. The method of claim 1, wherein the ttf is parsed from the bitstream.

20. The method of claim 1, wherein a value of the ttf is based on data already decoded.

21. The method of claim 1, wherein a depth of the TU within the transform tree is also used to determine the first set or second set of transforms is applied.

22. The method of claim 1, wherein a mapping of the transform types in the first set is altered to form the second set of transform types to be applied.

23. The method of claim 1, wherein the PU includes multiple TUs, and wherein TUs having predetermined characteristics are associated with an indicator signaled in the bitstream only for the first TU having the predetermined characteristics, and subsequent TUs having the predetermined characteristics use the indicator.

24. The method of claim 1, wherein the CU includes multiple TUs, and wherein TUs having predetermined characteristics are associated with an indicator signaled in the bitstream only for the first TU having the predetermined characteristics, and subsequent TUs having the predetermined characteristics use the indicator.

25. A method for coding pictures to obtain data for associated TUs and data for generating a transform tree, and data for obtaining prediction modes or directions associated with each Prediction Units (PUs), comprising:
defining a mapping table, wherein each row of the table has an associated index and a first set of transform types to be used for applying an inverse transformation to the data in TU;
selecting the first set of transform types according to an index;
applying a second set of transform types as the inverse transformation to the data, wherein the second set of transform types is determined according to the first set of transform types and a transform-toggle flag (ttf) to obtain a reconstructed prediction residual, and wherein the coding is performed in a codec, and wherein a decision as whether to alter the index is dependent upon a depth of the TU in the transform tree.

26. A method for coding pictures to obtain data for associated TUs and data for generating a transform tree, and data for obtaining prediction modes or directions associated with each Prediction Units (PUs), comprising:
defining a mapping table, wherein each row of the table has an associated index and a first set of transform types to be used for applying an inverse transformation to the data in TU;
selecting the first set of transform types according to an index;
applying a second set of transform types as the inverse transformation to the data, wherein the second set of transform types is determined according to the first set of transform types and a transform-toggle flag (ttf) to obtain a reconstructed prediction residual, and wherein the coding is performed in a codec, wherein a decision to alter the index is dependent upon dimensions of the TU.

* * * * *